Aug. 6, 1940.    F. W. LUTZ ET AL    2,210,090
GYRO-STABILIZED REFERENCE POINT FOR CAMERAS
Filed Jan. 12, 1938    3 Sheets-Sheet 1
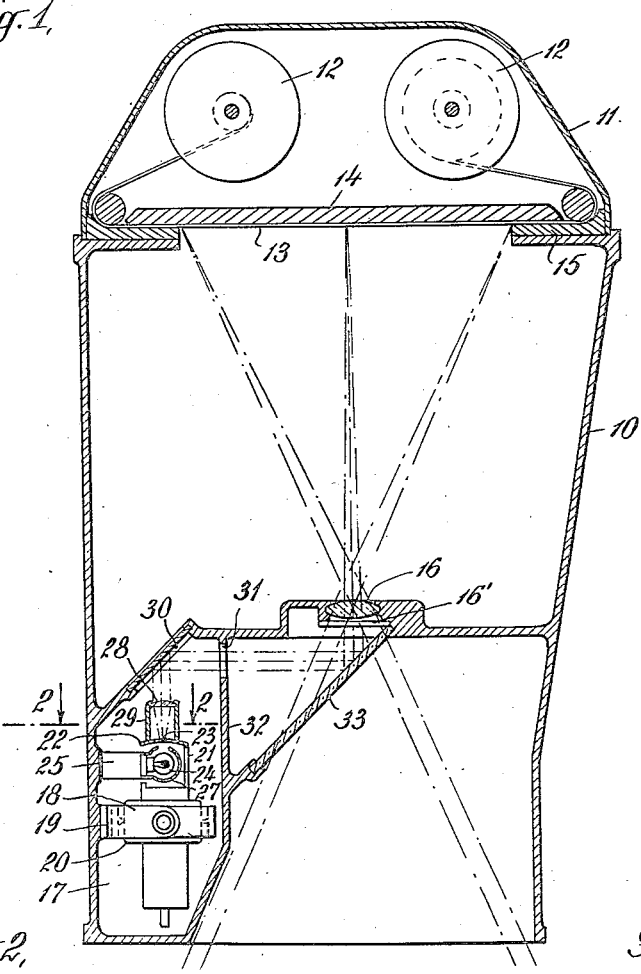
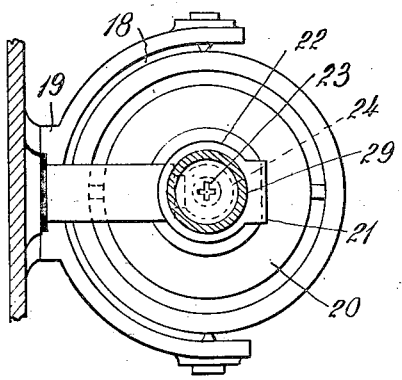
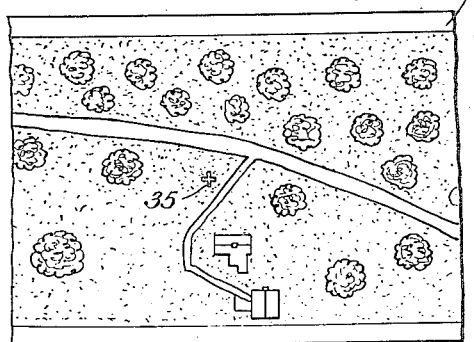

Aug. 6, 1940.  F. W. LUTZ ET AL  2,210,090
GYRO-STABILIZED REFERENCE POINT FOR CAMERAS
Filed Jan. 12, 1938  3 Sheets-Sheet 2

INVENTORS
Frederick W. Lutz
and John D. Pearce Jr.
BY
ATTORNEYS

Aug. 6, 1940.   F. W. LUTZ ET AL   2,210,090
GYRO-STABILIZED REFERENCE POINT FOR CAMERAS
Filed Jan. 12, 1938   3 Sheets-Sheet 3

Patented Aug. 6, 1940

2,210,090

UNITED STATES PATENT OFFICE 2,210,090

GYRO-STABILIZED REFERENCE POINT FOR CAMERAS

Frederick W. Lutz, Garden City, and John D. Peace, Jr., Flushing, N. Y., assignors to Fairchild Aerial Camera Corporation, Jamaica, N. Y., a corporation of New York Application January 12, 1938, Serial No. 184,530

8 Claims. (Cl. 95—1.1)

This invention relates to aerial cameras and has particular reference to a means for providing a stabilized reference mark on the camera film, in order to register on the photograph the point on the ground vertically beneath the camera at the instant of exposure. When the film is developed this reference mark clearly appears and serves as a datum point for various purposes, such as mapping and the like.

In accordance with the present invention, a gravity-stabilized light projection means is provided for automatically directing a pencil of light on the camera film to register thereon a fiducial or reference mark, which represents the ground point vertically beneath the camera at the instant of exposure.

In a preferred embodiment of the invention, a gyroscope is employed as the stable element for stabilizing the light projection means, which preferably includes an apertured screen or reticule, operative connections between the gyroscope and screen for stabilizing the latter, a source of light behind the screen for producing a beam of light through the aperture therein, and a suitable lens and reflector means for confining and directing the beam upon the camera film so that there is photographically registered on the photograph of a selected area of the ground a reference or fiducial mark indicating the point on the ground vertically beneath the camera at the time of exposure.

The reference or fiducial mark may be of any shape determined by the shape of the screen aperture, such as a small cross, and appears plainly on the film negative. Thus, if the camera is level at the time of the exposure, the stabilized fiducial or reference mark is found approximately in the center of the picture. Various modifications of the stabilizing and light projection may be provided.

For a more complete understanding of the invention, reference may be had to the accompanying drawings, in which:

Figure 1 illustrates a vertical section through a more or less conventional form of aerial camera equipped with the apparatus of this invention, wherein the stabilizing and light projection means is positioned outside of the camera and the stabilized light pencil directed into the camera through the lens;

Fig. 2 is a horizontal section through the upper portion of the gyroscope stabilizing system, as seen along the line 2—2 of Fig. 1;

Fig. 3 illustrates a strip of developed film having on it the stabilized reference or fiducial mark indicating the spot vertically beneath the camera when the picture was taken;

Figure 4:
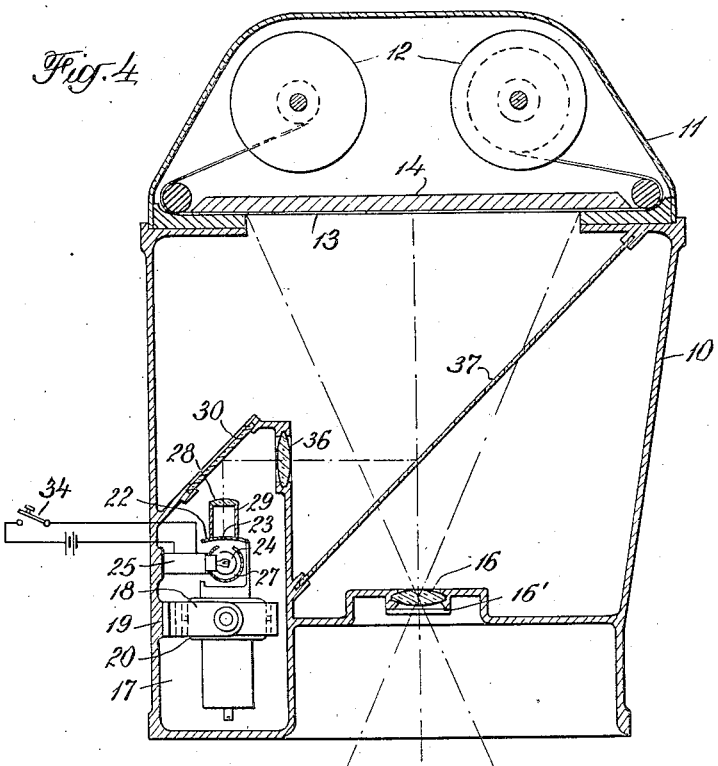
Fig. 4 illustrates a modification thereof, also in vertical section, wherein the stabilized pencil is directed on the film from a point between the film and the lens within the camera.

Referring to Fig. 1 of the drawings, numeral 10 designates the housing of an aerial camera of the Fairchild type, for example, which is suitably mounted in the usual way on a universal support for maintenance of a normal vertical position on an aeroplane or other aerial craft, and which is fitted with a removable film magazine 11 having the reels 12 between which the film 13 passes. A pressure plate 14 holds the film 13 flat against the frame 15. Upon exposure, the image of the selected area of the ground beneath the camera is projected by lens 16 upon the film.

Formed in or associated with the camera housing 10 is chamber 17. Suspended within the chamber 17, for universal movement on a gimbal support 18 mounted on a bracket 19 secured to the wall of the housing, as illustrated in Figs. 1 and 2, is a small vertical-axis gyroscope 20, either of the electrically-driven or air-sustained rotor type, depending upon circumstances and requirements. For example, for use with a vacuum-back camera, the use of an air-sustained type gyroscope would be indicated. While a gyroscope is preferred, it is to be understood that under certain conditions other relatively stable elements, such as a pendulum, may be utilized with equal facility.

Secured to or mounted on the upper part of the casing of the gyroscope 20 is a frame 21 carrying the convex opaque screen 22, spaced above the gyroscope and pierced with an aperture of any selected shape, such as the cross 23 shown in Fig. 2, whose geometrical center lies exactly on the vertical axis of the gyroscope 20. Thus, no matter what the angle or direction of the relative tilt of the gyroscope 20 the center of the aperture 23, i. e., the center of the reticule so formed, is always on the vertical axis of the gyroscope and indicates that axis. The center of curvature of convex screen 22 is the mean center of the gimbal support 18, so that the tilt of the gyroscope will not distort the light beam.

Positioned beneath the screen 22, is a suitable source of light, such as the small incandescent lamp 24, which may be conveniently mounted in fixed position on a bracket 25 secured to the housing, or if desired, carried by the frame 21 with flexible feed wires leading thereto. To confine its illumination, the lamp 24 is preferably enveloped in a hood 27 having an opening opposite the screen 22. Inasmuch as the light projection means 24 is outside the shutter 16' of the camera, illumination of the lamp 24 need not be controlled in accordance with the shutter operation, since the latter prevents the light beam from striking the film.

The light rays issuing from the screen 22, aperture 23 or reticule are rendered parallel and confined into a narrow beam by the lens 28 carried by a tube 29 mounted on frame 21 and positioned on the vertical axis of the gyroscope for movement therewith. The beam is reflected laterally by a 45° total reflector 30 through an opening 31 in the housing wall 32 upon a translucent reflector 33, such as a half-silvered plane mirror, positioned at an angle of 45° in the field of view of the camera opposite the main lens 16. The main lens of the camera, whose focal plane is at the film 13, confines and directs the image of the reticule aperture 23 upon the film 13. The size of the aperture 23 is selected in accordance with the desired size of the reference mark desired on the film, consideration being given to the reduction afforded by the lens 16.

Since the light in the reticule pencil is more intense than that encountered in photography, the reference or fiducial mark appearing on the film is always visible. Fig. 3 illustrates a film negative having thereon the fiducial mark 35 which indicates the point on the ground vertically beneath the camera at the instant the picture was taken. As such it may be used as a datum point from which measurements for various purposes or corrections may be made. It will be understood that as the camera or aircraft tilts relatively to the stable gyroscope, the reference or fiducial mark photographed on the film in the manner described, is shifted accordingly from its normal center point on the film.

Fig. 4 illustrates a modified arrangement of the apparatus of this invention. Here the fiducial or reference mark registering means is placed within the camera between the lens 16 and the film 13, so that the lens 16 is not used as a part of the registering means, as in the arrangement of Fig. 1. The gyroscope 20, lamp 24, screen 22, lens 28, and reflector 30 are arranged and mounted as in Fig. 1, but at a higher level within or alongside the body 10 of the camera proper.

A lens 36 having the same focal length as the camera lens 16 directs the horizontally reflected light pencil from 45° reflector 30 upon a translucent reflector 37 positioned at an angle of 45° to the focal axis of the camera lens 16 in the field of view of the camera between the lens 16 and the film 13. The reflector 37 is preferably very thin so as to cause but little refraction of the light directed upon the film by the lens 16 during an exposure. A partially-silvered film of cellulose derivation will serve the purpose. Because the optical system is inside the camera, the lamp 24 is illuminated only when the shutter 16' is tripped. To that end the switch 34 in the circuit of lamp 24 is arranged to be closed by or simultaneously with the operation of the shutter trip lever or key.

The distance between the lens 36 and the reflector 37 plus the distance between the reflector 37 and the film 13 is made equal to the distance between the lens 16 and the film 13, so that the image of the reticule 22 lies in the focal plane of lens 16, as before. This requirement governs the position of the gyroscope 20 and appurtenant parts in the camera 10 housing. The function and operation of the arrangement of Fig. 4 is the same as that of Fig. 1 and has the advantage of greater compactness.

Figure 5:
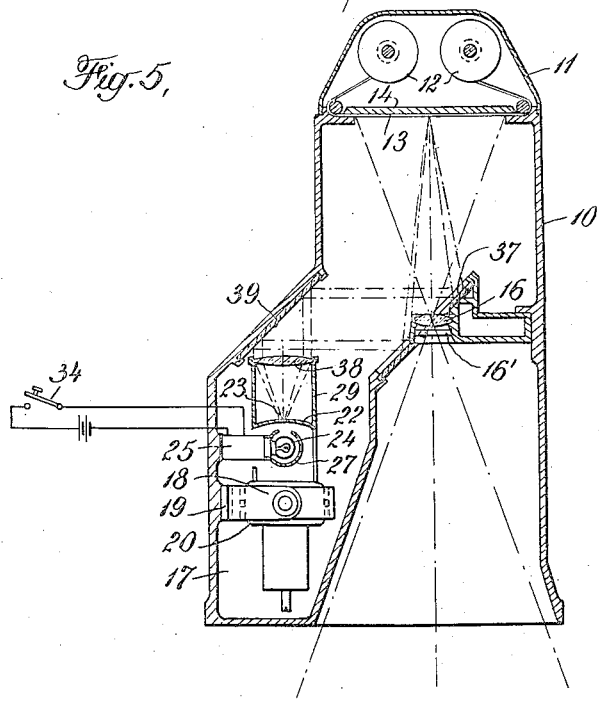
Fig. 5 is a vertical section through a modification in which a reflector encircles the camera lens for directing the stabilized pencil on the film.

In Fig. 5 there is shown an arrangement which dispenses with a translucent mirror in the field of view of the camera, and utilizes a suitable reflector for focusing the image of the stabilizer reticule upon the film. As is shown in Fig. 5, a relatively large, fixed concave reflector 37 is apertured for the camera lens 16 so as to encircle it, and is so positioned that the parallel rays directed laterally thereon by the lens and plane reflector combination 38, 39, are focused on the film 13 so that the image of the reticule is sharp and clear. The function and operation of this form of the apparatus of this invention is the same as those of Figs. 1 and 4. As in the arrangement of Fig. 4, the lamp 24 is illuminated only when the shutter 16, connected to switch 34, is tripped.

Figure 6:
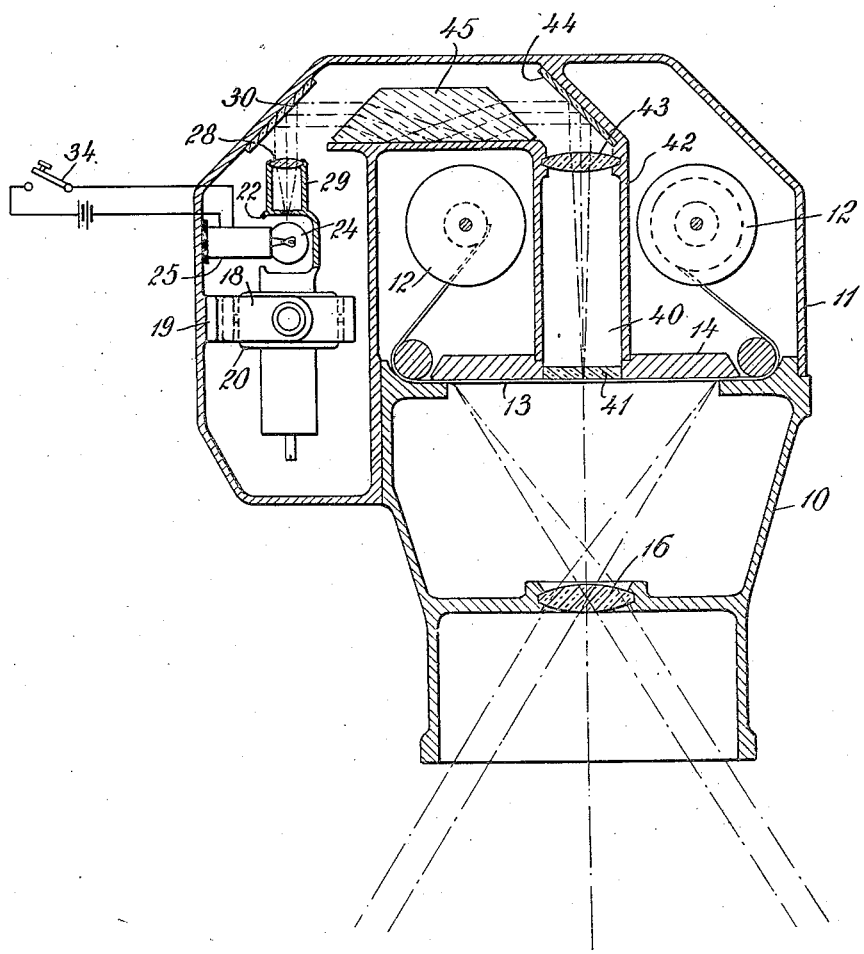
Fig. 6 is a vertical section through another modification.

In the arrangement of Fig. 6, the fiducial mark is recorded on the film from the back thereof, so that there are no reflectors in the field of view or in front of the film. The gyroscope 20, apertured screen 26 and lens 28 carried by the gyroscope, lamp 24 with switch 34, and 45° reflector 30 are arranged as before, but at a higher level at the side of the camera housing 10 opposite the film magazine 11 containing the reels 12 between which the film 13 passes under pressure plate 14.

The center of the pressure plate 14 is provided with a relatively large aperture 40 over which the film 13 is stretched with its rear surface exposed through the aperture. Preferably the aperture contains a translucent plate 41 flush with the surface of the pressure plate 14. Extending vertically upwardly from aperture 40 is a tube 42 having a lens 43 at its upper end of the same focal length as camera lens 16 and hence is spaced from film 13 the same distance as is lens 16.

Positioned above lens 42 is a 45° reflector 44. Interposed between reflector 30 and 44 is a double prism 45 whose leading face reflects light downwardly, upon its lower face, which reflects the light through the rear face upon the reflector 44, which, in turn, reflects the image through lens 43 upon the rear of the film 13. Since the film back is transparent and has the emulsion on its underside, the image of the screen 22 aperture is recorded on the film. As before, switch 34 is preferably connected for actuation by or simultaneously with the shutter trip lever, so that the image of the screen 22 aperture is directed on the film and when the camera film 13 is exposed. Although the stabilized fiducial or reference mark 35 is thus recorded on the camera film 13 as a record of the ground point vertically beneath the camera at the instant of exposure, the recording of other data from the rear of the film in the same or similar way, lies within the scope of the invention.

It will be seen that the apparatus of this invention provides a very simple but effective means for indicating permanently upon the negative the level condition under which the picture was taken and provides a fixed and accurate datum point for various purposes. While certain preferred embodiments of the invention have been illustrated and described herein, it is to be understood that the invention is not limited thereby, but is susceptible of changes in form and detail within the scope of the appended claims.

The term "film" as used herein and in certain of the appended claims comprehends all forms of photosensitive films however applied, whether on a plate, flexible cellulose derivative strip, or the like.

We claim:

1. In an aerial camera adapted to be mounted on an aeroplane or the like and arranged for exposure of a photosensitive film, said film being carried in the camera for movement therewith, the combination of a member movably associated with said camera and adapted to remain in a predetermined position regardless of the attitude of the camera at the instant of exposure of said film, said position being at the top of a vertical line extending from the camera to that point in the field of view of the camera at the other end of said line, stable means adapted to be movably mounted on said camera, means for mounting said member on said stable means for movement relative to said camera so that said member always remains in said predetermined position, and means adapted to be mounted on said camera and optically arranged relative to said member and said film for projecting an image of said member on said film within the view recording area thereof at the instant of exposure, whereby the developed film which records the camera's field of view includes a picture of said image as a reference of that portion of the view which lies vertically beneath the camera at the instant of exposure.

2. In an aerial camera adapted to be mounted on an aeroplane or the like and arranged for exposure of a photosensitive film, said film being carried in the camera for movement therewith, the combination of a member movably associated with said camera and adapted to remain in a predetermined position regardless of the attitude of the camera at the instant of exposure of said film, said position being at the top of a vertical line extending from the camera to that point in the field of view of the camera at the other end of said line, a gyroscope adapted to be movably mounted on said camera, means for mounting said member on said gyroscope for movement relative to said camera so that said member always remains in said predetermined position, and means adapted to be mounted on said camera and optically arranged relative to said member and said film for projecting an image of said member on said film within the view recording area thereof at the instant of exposure, whereby the developed film which records the camera's field of view includes a picture of said image as a reference of that portion of the view which lies vertically beneath the camera at the instant of exposure.

3. In an aerial camera adapted to be mounted on an aeroplane or the like and arranged for exposure of a photosensitive film, said film being carried in the camera for movement therewith, the combination of a member movably associated with said camera and adapted to remain in a predetermined position regardless of the attitude of the camera at the instant of exposure of said film, said position being at the top of a vertical line extending from the camera to that point in the field of view of the camera at the other end of said line, stable means adapted to be movably mounted on said camera, means for mounting said member on said stable means for movement relative to said camera so that said member always remains in said predetermined position, and means adapted to be mounted on said camera and optically arranged relative to said member and said film for projecting an image of said member on said film within the view recording area thereof at the instant of exposure, said image projecting means including an optical system comprising a plurality of lenses including the camera lens, all of said lenses being mounted on said camera, whereby the developed film which records the camera's field of view includes a picture of said image as a reference of that portion of the view which lies vertically beneath the camera at the instant of exposure.

4. In an aerial camera adapted to be mounted on an aeroplane or the like and arranged for exposure of a photosensitive film, said film being carried in the camera for movement therewith, the combination of a member adapted to be movably associated with said camera and adapted to remain in a predetermined position regardless of the attitude of the camera at the instant of exposure of said film, said position being at the top of a vertical line extending from the camera to that point in the field of view of the camera at the other end of said line, said member including an apertured element, stable means adapted to be movably mounted on said camera, means for mounting said member on said stable means for movement relative to said camera so that said member always remains in said predetermined position, a source of light associated with said apertured element, and an optical system mounted in said camera in operative relationship to said member and to said source of light for projecting an image of the aperture in said element on the film at the instant of exposure thereof, whereby the developed film which records the camera's field of view includes a picture of said image as a reference of that portion of the view which lies vertically beneath the camera at the instant of exposure.

5. In an aerial camera adapted to be mounted on an aeroplane or the like and arranged for exposure of a photosensitive film, said film being carried in the camera for movement therewith, the combination of a member movably associated with said camera and adapted to remain in a predetermined position regardless of the attitude of the camera at the instant of exposure of said film, said position being at the top of a vertical line extending from the camera to that point in the field of view of the camera at the other end of said line, stable means adapted to be movably mounted on said camera, means for mounting said member on said stable means for movement relative to said camera so that said member always remains in said predetermined position, means adapted to be mounted on said camera and operatively associated with said member for projecting an image thereof, and an optical system adapted to be mounted in said camera and including a plurality of reflectors for transmitting said projected image onto said film, one of said reflectors being positioned substantially in alignment with the camera lens and film but exteriorly of said lens so that the projection of the image passes through the camera lens, whereby the developed film which records the camera's field of view includes a picture of said image as a reference of that portion of the view which lies vertically beneath the camera at the instant of exposure.

6. In an aerial camera adapted to be mounted on an aeroplane or the like and arranged for exposure of a photosensitive film, said film being carried in the camera for movement therewith, the combination of a member movably associated with said camera and adapted to remain in a predetermined position regardless of the attitude of the camera at the instant of exposure of said film, said position being at the top of a vertical line extending from the camera to that point in the field of view of the camera at the other end of said line, stable means adapted to be movably mounted on said camera, means for mounting said member on said stable means for movement relative to said camera so that said member always remains in said predetermined position, and means adapted to be mounted in said camera and including a plurality of lenses and reflectors optically associated with said member for projecting an image thereof on the reverse side of said film at the instant of exposure thereof, one of said reflectors comprising a double prism, whereby the developed film which records the camera's field of view includes a picture of said image as a reference of that portion of the view which lies vertically beneath the camera at the instant of exposure.

7. In an aerial camera adapted to be mounted on an aeroplane or the like and arranged for exposure of a photosensitive film, said film being carried in the camera for movement therewith, the combination of a member movably associated with said camera and adapted to remain in a predetermined position regardless of the attitude of the camera at the instant of exposure of said film, said position being at the top of a vertical line extending from the camera to that point in the field of view of the camera at the other end of said line, stable means adapted to be movably mounted on said camera, means for mounting said member on said stable means for movement relative to said camera so that said member always remains in said predetermined position, and means adapted to be mounted in said camera and operatively associated with said member for creating and projecting an image thereof onto said film at the instant of exposure, said last-mentioned means including a plurality of reflectors, at least one of which is positioned between the camera lens and the film, whereby the developed film which records the camera's field of view includes a picture of said image as a reference of that portion of the view which lies vertically beneath the camera at the instant of exposure.

8. An aerial camera adapted to be mounted on an aeroplane or the like and arranged for exposure of a photosensitive film, said film being carried in the camera for movement therewith, said camera comprising, in combination, a casing adapted to support the film and the camera lens, a gyroscope mounted in said casing, an apertured member, means connecting said apertured member with said gyroscope so that said member moves therewith in relation to the camera, a source of light in said casing and positioned in relation to the aperture in said member so that a beam of light in the general shape of said aperture is projected therefrom, and an optical system in said casing including a plurality of reflectors optically arranged with respect to said aperture and to said film so that said beam of light is projected against said film, whereby that portion of the film against which said beam is projected will have recorded thereon when developed that point of the view photographed which is vertically beneath the camera at the instant of exposure.

FREDERICK W. LUTZ.
JOHN D. PEACE, Jr.